United States Patent Office 2,781,673
Patented Feb. 19, 1957

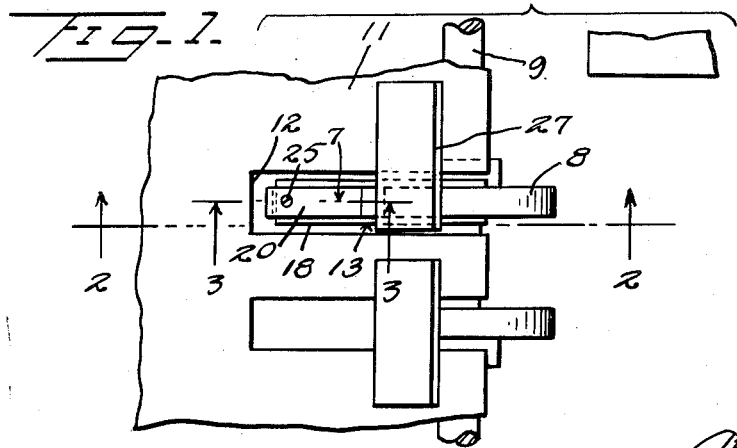
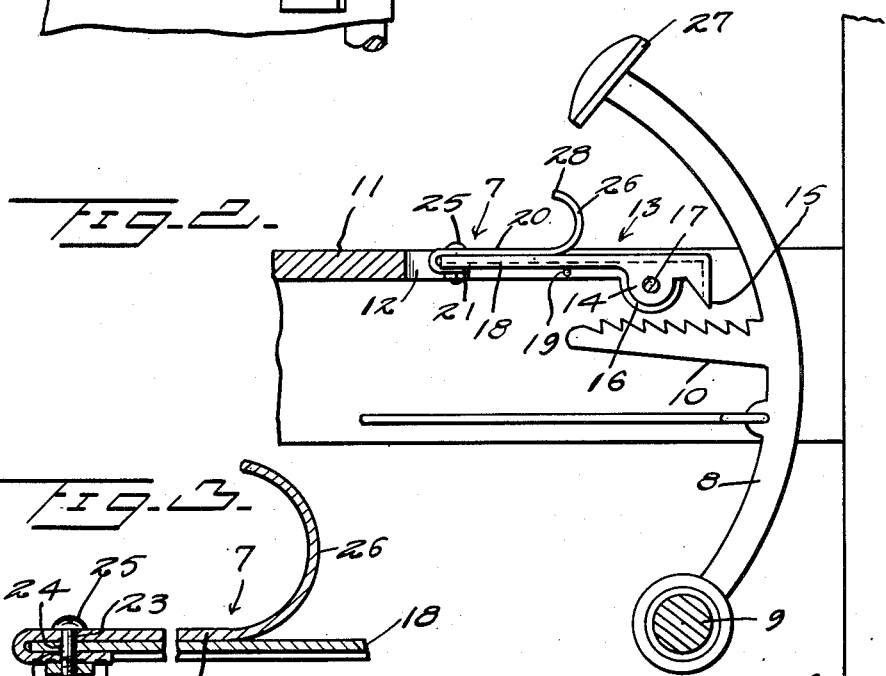
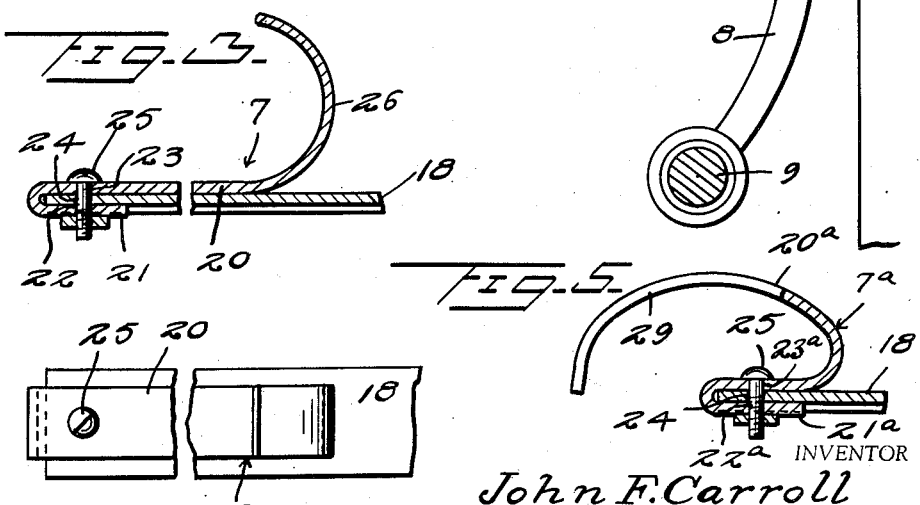
INVENTOR
John F. Carroll

2,781,673

BRAKE LATCH ATTACHMENT

John F. Carroll, New Salem, Ill.

Application March 6, 1953, Serial No. 340,776

3 Claims. (Cl. 74—540)

This invention relates to a novel attachment for a conventional foot brake latch of the type usually provided on modern tractors and which are employed at the will of the operator for holding the brakes actuated by a foot pedal in an applied position.

More particularly, it is an aim of the present invention to provide an attachment of extremely simple construction which may be quickly and easily applied to a conventional foot brake pedal latch without removing or replacing the conventional latch and with only an immaterial modification thereof, so that the conventional latch will still function and may be employed in a conventional manner.

Another object of the invention is to provide a latch attachment which may be very economically manufactured and sold and which may be readily applied by the purchaser to a tractor brake pedal latch and adjusted by the purchaser to be operated either with the hand or foot.

Various other objects and advantages of the invention will hereinafter become more fully apparent from the following description of the drawing, illustrating presently preferred embodiments thereof, and wherein:

Figure 1 is a fragmentary plan view of a portion of a conventional tractor showing the attachment applied to a brake pedal latch thereof;

Figure 2 is an enlarged longitudinal sectional view taken substantially along a plane as indicated by the line 2—2 of Figure 1;

Figure 3 is an enlarged fragmentary longitudinal sectional view taken substantially along a plane as indicated by the line 3—3 of Figure 1;

Figure 4 is a fragmentary top plan view of the attachment shown in an applied position, and Figure 5 is a fragmentary view partly in elevation and partly in section, similar to Figure 3 but illustrating a slightly modified form of the attachment.

Referring more specifically to the drawing, for the purpose of illustrating a preferred application and use of the brake latch attachment, designated generally 7 and comprising the invention, a portion of a conventional tractor is illustrated in Figures 1 and 2 including a foot operated brake pedal 8 which is fixed to a shaft 9 which applies a brake or brakes of the vehicle or tractor when the shaft 9 is turned clockwise as seen in Figure 2 by a downward or forward pressure on the brake pedal 8 in a direction from left to right of Figure 2. A toothed latch segment or rack bar 10 is fixed to an intermediate portion of the brake pedal arm and extends rearwardly therefrom as illustrated in Figure 2 and has the teeth thereof formed in its upper edge and facing rearwardly. A floor board 11 is provided with a longitudinally extending slot or opening 12 which opens outwardly of the forward edge thereof to swingably accommodate therein a brake latch, designated generally 13. The brake latch 13 comprises an elongated bar or strip having down turned side edges forming flanges which are provided with integral depending transversely aligned bearing portions 14 adjacent a forward end thereof. The latch 13 at its forward end is provided with a depending portion forming a latch dog or pawl 15. The bearing portions 14 are disposed between depending elements 16 constituting a part of the floor board 11 and which support a pivot pin or axle 17 which extends through and is journaled in the bearings 14 and which constitutes the pivotal support of the brake pedal latch 13. The latch 13 includes a rearwardly extending lever portion 18 the distal end of which is spaced a substantially greater distance from the pivot 17 than the latch dog 15 and which constitutes the preponderance of weight of the latch 13, so that said latch normally tends to rock counterclockwise about its pivot 17, as seen in Figure 2, for elevating the latch dog 15. Any suitable stop may be provided for limiting this counterclockwise swinging movement of the latch 13, as for example a stop 19 as seen in Figure 2, to prevent the dog 15 from swinging upwardly beyond its position of Figure 2. The parts 8 to 19, inclusive, constitute conventional portions of a tractor and have been illustrated and briefly described merely to afford a better understanding of the brake latch attachment 7.

The brake latch attachment 7 comprises an elongated strip of metal 20 which is sufficiently deformable so that one end thereof may be bent down and back upon itself to form a hook 21 in which is received the distal rear end of the latch portion 18, as best illustrated in Figure 3. Said hook portion 21 is disposed on the underside of the latch portion 18 and is provided with an opening 22 which aligns with a corresponding opening 23 of a portion of the strip 20 which is located adjacent the hook portion 21 and which engages the upper side of the latch portion 18. The latch 13 is modified only to the extent that an opening 24 is drilled through the portion 18 near its distal end to align with the openings 22 and 23 and so that said aligned openings will receive the shank of a bolt and nut fastening 25 by which the attachment 7 is detachably secured to the latch portion 18 and longitudinally thereof. The strip 20 extends forwardly from the fastening 25 along the upper side of the latch portion 18 and the forward free end thereof is bent upwardly and then rearwardly to provide a relatively large rounded rearwardly opening hook portion 26 which is disposed beneath and adjacent the tread plate 27 of the brake pedal 8.

From the foregoing it will be apparent that the tractor operator may displace the brake pedal 8 downwardly and forwardly by applying the ball of the foot to the tread plate 27 and while the pedal 8 is depressed and the brakes, not shown, actuated thereby applied, the foot may be rocked about the tread plate 27 as a fulcrum so that the heel will engage against the bill portion 28 of the hook 26 to exert a forward thrust thereagainst in a direction along a line passing above the pivot 17. This will cause the latch 13 to rock clockwise about the pivot 17, as seen in Figure 2, to displace the latch dog 15 downwardly into engagement with one of the teeth of the latch segment 10 to latch the brake pedal 8 in a depressed position with the brakes applied. The pressure of the brake pedal 8 tending to return to its position of Figures 1 and 2 will retain the dog 15 in engagement with a tooth of the latch segment 10 until released therefrom by a further depressing force on the brake pedal 8, whereupon the weight of the lever end 18 will swing the latch 13 counterclockwise back to its inoperative position of Figure 2. The attachment 7 as illustrated in Figures 1 to 4 is best adapted for use by tall tractor operators.

A slightly modified form of the attachment, designated 7a, is best adapted for use by shorter operators whose legs are not sufficiently long so that the foot can be readily swung while the brake is held applied for exerting a forward thrust against the bill portion 28. The attachment 7a, as illustrated in Figure 5, likewise includes an elongated strip of bendable or deformable metal 20a having an end portion 21a, corresponding to the hook portion 21, and aligned openings 22a and 23a, corresponding to the openings 22 and 23 for registration with the latch opening 24 to receive the fastening 25 for securing the attachment 7a to the lever portion 18 in the same manner that the attachment 7 is secured thereto. The longer free end portion of the strip 28, forwardly of and adjacent the fastening 25, is bent upwardly and rearwardly and then downwardly to provide a handle 29 adapted to be manually engaged with the finger for rocking the brake pedal latch 13 clockwise as illustrated in Figure 2 to engage the pawl 15 between teeth of the latch segment 10 while the brake pedal 8 is held depressed, to thus latch the brakes controlled by said pedal in an applied position. The latch 13 will obviously release automatically, as previously described, when a pressure is again applied to the brake pedal. The attachment 7a is adapted for use by persons with short legs who cannot conveniently operate the attachment 7 with the heel of the foot and the handle portion 29 is disposed so that it will be convenient to be reached manually without risk of the finger being stepped on by the foot used to apply the brakes.

Various other modifications and changes are contemplated and may obviously be resorted to, without departing from the spirit or scope of the invention as hereinafter defined by the appended claims.

I claim as my invention:

1. An attachment for a brake pedal latch comprising an elongated strip of metal having a turned back end forming a hook adapted to engage around an end of a pivoted brake pedal latch and including portions disposed above and beneath the latch end, said portions having aligned openings adapted to register with an opening in said latch end, a fastening extending through the openings of the hook portion and of the latch end for securing the strip to the latch end and longitudinally thereof, and said strip including a long free end portion forming an extension of the hook portion disposed on the upper side of the latch, said extension extending upwardly from the upper side of the latch to provide a portion adapted to be engaged by the vehicle operator for rocking the latch to an operative position.

2. A brake latch attachment as in claim 1, said upwardly extending portion of the extension being adapted to be disposed beneath and adjacent a foot pedal controlled by the latch and including a turned back terminal portion adapted to be engaged by the heel of the foot holding the brake pedal in a depressed position for rocking the latch to an operative position.

3. A brake latch attachment as in claim 1, said extension defining a handle portion disposed over the first mentioned hook shaped end of the strip and adapted to be manually engaged for rocking the brake latch to an operative position.

References Cited in the file of this patent

UNITED STATES PATENTS

| | | |
|---|---|---|
| 670,983 | Corson et al. | Apr. 2, 1901 |
| 1,281,891 | Anderson | Oct. 15, 1918 |
| 1,390,148 | Maynard | Sept. 6, 1921 |
| 2,399,835 | Stoner | May 7, 1946 |
| 2,504,258 | Elenewicz | Apr. 18, 1950 |